(12) United States Patent
Loomans et al.

(10) Patent No.: US 7,873,503 B2
(45) Date of Patent: Jan. 18, 2011

(54) METHOD, SYSTEM, AND PRODUCT FOR PERFORMING SUB-CONFIGURATION OF ENTITIES

(75) Inventors: Jeffrey William Loomans, San Francisco, CA (US); Lisa Ann Laane, Cupertino, CA (US)

(73) Assignee: Siebel Systems, Inc., San Mateo, CA (US)

( * ) Notice: Subject to any disclaimer, the term of this patent is extended or adjusted under 35 U.S.C. 154(b) by 1320 days.

(21) Appl. No.: 10/299,215

(22) Filed: Nov. 18, 2002

(65) Prior Publication Data

US 2010/0204970 A1 Aug. 12, 2010

Related U.S. Application Data

(63) Continuation of application No. 09/967,852, filed on Sep. 28, 2001, now abandoned.

(51) Int. Cl.
G06F 17/50 (2006.01)
G06F 9/44 (2006.01)

(52) U.S. Cl. ........................................ 703/13; 717/116
(58) Field of Classification Search ............... 703/13, 703/22; 717/121, 116
See application file for complete search history.

(56) References Cited

U.S. PATENT DOCUMENTS

| | | | | |
|---|---|---|---|---|
| 5,247,683 A * | 9/1993 | Holmes et al. | ............... | 709/221 |
| 5,499,357 A * | 3/1996 | Sonty et al. | .................. | 710/104 |
| 5,515,524 A * | 5/1996 | Lynch et al. | ................... | 703/13 |
| 5,815,415 A * | 9/1998 | Bentley et al. | ................. | 703/4 |
| 5,970,242 A * | 10/1999 | O'Connor et al. | ........... | 717/100 |
| 6,223,342 B1 * | 4/2001 | George | ........................ | 717/116 |
| 6,237,139 B1 * | 5/2001 | Hotta et al. | .................. | 717/126 |
| 6,256,773 B1 * | 7/2001 | Bowman-Amuah | ......... | 717/121 |
| 6,289,382 B1 * | 9/2001 | Bowman-Amuah | ......... | 709/226 |
| 6,711,688 B1 * | 3/2004 | Hubacher et al. | .............. | 726/7 |
| 6,717,595 B1 * | 4/2004 | Yennaco | ..................... | 715/765 |
| 6,758,757 B2 * | 7/2004 | Luciano et al. | ............... | 463/43 |
| 6,854,052 B2 * | 2/2005 | Beeston et al. | ................. | 713/1 |
| 6,996,711 B2 * | 2/2006 | Patterson et al. | ............ | 713/156 |

* cited by examiner

*Primary Examiner*—Paul L Rodriguez
*Assistant Examiner*—Eunhee Kim
(74) *Attorney, Agent, or Firm*—Campbell Stephenson LLP

(57) ABSTRACT

Techniques to performing sub-configuration of components of an entity. In one method, the entity is configured via a parent model and each sub-configurable component is configured via one of a number of sub-models. Initially a selection to configure a particular sub-configurable component of the entity is received, and a sub-model for the selected component is identified. One or more values for one or more features of the selected component are received (e.g., from the parent model or via the sub-model) and form a configuration for the component, which is then validated based on the associated sub-model and the received values. Configuration of the entity is also validated based on the parent model and the validated configuration for the selected component. Feedbacks may be provided for each configuration of the parent model and sub-models. The data for the parent model and sub-models may be localized or globalized.

29 Claims, 11 Drawing Sheets

| A<br>Chasis | B<br>Processor | C<br>Drive Bay 1 | D<br>Drive Bay 2 | E<br>Drive Bay 3 | F<br>Storage | G<br>Supply |
|---|---|---|---|---|---|---|
| short | P4 1.0GHz | Floppy | 32xCD | 6.4 GB | None | 20 A |
| medium | P4 1.0GHz | Floppy | 32xCD | 6.4 GB | None | 20 A |
| tall | P4 1.0GHz | Floppy | 32xCD | 6.4 GB | None | 20 A |
| short | P4 1.3GHz | Floppy | 32xCD | 6.4 GB | None | 20 A |
| ⋮ | | | | | | |

METHOD, SYSTEM, AND PRODUCT FOR PERFORMING SUB-CONFIGURATION OF ENTITIES

BACKGROUND OF THE INVENTION

The present invention relates generally to computer processing, and more particularly to techniques for performing sub-configuration of complicated entities.

For many applications, it is necessary to define and represent complicated structures or entities. A complicated entity may include multiple components, each of which may be configurable and may further include sub-components. As the number of components and sub-components increases, the task of modeling such entity also (exponentially) increases along with the resources needed to represent the entity.

One example of such a complicated entity may be a computer system offered for sale by a vendor. The computer system may include a number of components (e.g., chassis, processor, storage, and so on) that may be customized to suit a buyer's preference and requirements. Each component may be associated with a number of possible choices (e.g., the chassis may be tall, medium, or short). A buyer may then customize the computer system by selecting a particular choice for each component.

The configuration of a complicated entity can be challenging. For practical considerations and possibly due to system constraints, not all possible combinations of choices for the components (i.e., configurations) may be available or valid. In one conventional implementation, rules and constraints may be defined to validate configurations. These rules and constraints may be invoked once a specific configuration has been selected, and are used to determine whether or not that configuration is valid. In another conventional implementation, all valid configurations may be defined in a master table. Once a specific configuration has been selected, the master table may be consulted to validate the configuration. However, this master table may be very large for a complicated entity.

Besides the complexity in representing complicated entities and valid configurations, other challenges may also be associated with the configuration process. For example, if the validation of a selected configuration is performed after all choices have been selected and the configuration is then deemed to be invalid, then the selection process may need to be repeated again. Each iteration of the selection and validation processes is typically associated with a cost that should be minimized. Moreover, it may be desirable to provide recommendations based on choices that have already been selected, and this may be difficult to support using the conventional rules/constraints or a master table.

Thus, techniques that can be used to support configuration of complicated entities are highly desirable.

SUMMARY OF THE INVENTION

The invention provides techniques to configure complicated entities using sub-configuration, which effectively partitions the configuration of a complicated top-level entity into a set of configurations of smaller sub-level entities (i.e., components of the top-level entity) in combination with a configuration of a "simplified" top-level entity. The top-level entity may be represented by and configured via a parent model, and each sub-configurable component may be represented by and configured via a child sub-model.

Sub-configuration simplifies the data modeling for configuring complicated entities. (Data modeling is the process of encoding data and logic that represent information used to represent configuration information.) With sub-configuration, shared options for the top-level entity may be extracted and modeled with a single sub-model or a set of sub-models. Each sub-model may be referenced and instantiated as needed for any of the common options. The sub-models reduce the amount of redundancy by localizing data and logic needed to represent the shared options, and further simplify the data structure and logic for the top-level entity.

Multiple levels of sub-configuration may be supported. In this case, each child sub-model may be a parent model that includes one or more child sub-models. Each child sub-model may also be viewed as an independent model, and each sub-configurable component may be configured and validated individually and independently.

Sub-configuration may be implemented in various manners and based on various data modeling structures. In one implementation, data for the parent model and child sub-models is localized, and parameter values may be bi-directionally passed between the parent model and sub-models such that configuration may be achieved at both levels. In another implementation, data for the parent model and sub-models is globalized, and data for each level is available to the other level.

A specific embodiment of the invention provides a method for performing sub-configuration of components of an entity. In the method, the entity is configured via a parent model and each sub-configurable component is configured via one of a number of sub-models. Initially a selection to configure a particular sub-configurable component of the entity is received, and a sub-model for the selected component is identified. One or more values for one or more features of the selected component are received (e.g., from the parent model or via the sub-model) and form a configuration for the component, which is then validated based on the associated sub-model and the received values. Configuration of the entity is also validated based on the parent model and the validated configuration for the selected component.

A number of sub-configurable components may be configured and validated, one component at a time, and the parent model may be validated after each validated configuration of a sub-configurable component. Feedbacks relating to the validity of the selections may be provided for each configuration of the parent model and sub-models. The data for the parent model and sub-models may be localized or globalized. The parent model and one or more sub-models may be displayed on one common user interface screen.

The invention further provides other methods, computer program products, and systems capable of implementing various aspects, embodiments, and features of the invention, as described in further detail below.

The foregoing, together with other aspects of this invention, will become more apparent when referring to the following specification, claims, and accompanying drawings.

DESCRIPTION OF THE SPECIFIC EMBODIMENTS

The techniques described herein may be used to model and represent any complicated entity having a number of components. These techniques may further be used to support the configuration of the components at the component level using sub-configuration. For clarity, various aspects, embodiments, and features of the invention are described for a specific example entity, which is a computer system.

Figures 1, 2B:
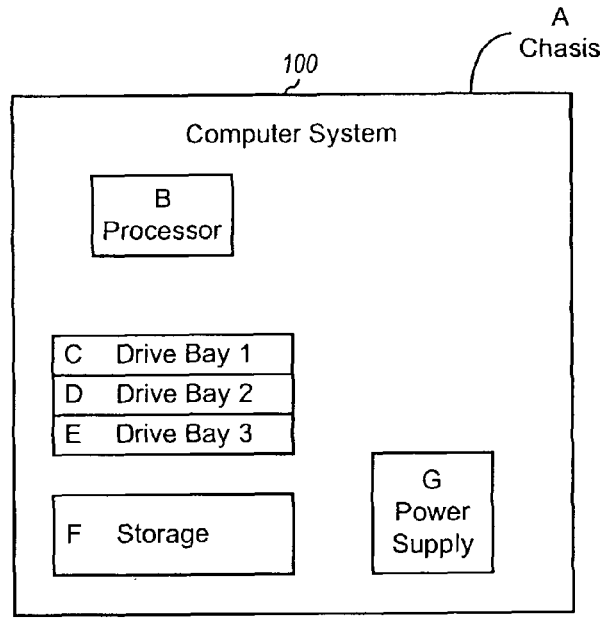
FIG. 1 shows a computer system that may be modeled and configured using the techniques of the invention.
FIG. 2B shows a configuration table used to represent all possible valid configurations of the computer system.

FIG. 1 shows a computer system 100 that may be modeled and configured using the techniques of the invention. System 100 includes a number of components (or top-level options), each of which may be a "selectable" option or a "sub-configurable" option. In the example shown, the options includes: A—Chassis, B—Processor, C—Drive Bay 1, D—Drive Bay 2, E—Drive Bay 3, F—Storage Device (or Storage), and G—Power Supply (or Supply). Each selectable option may be associated with a respective set of choices that are specific for that option. For example, the Chassis option may be associated with three possible choices—Short, Medium, and Tall. Each top-lever sub-configurable option may be associated with any number of sub-level options, each of which may be a selectable option or a sub-configurable option. Each top-level sub-configurable option may be configured based on its associated sets of sub-level options. For example, each of Drive Bays 1, 2, and 3 may be used to install a disk drive, a CD-drive, or a hard disk (i.e., three possible options), or nothing at all (which may be a default). The Disk Drive, CD-Drive, and Hard Disk options may each be further associated with one or more sets of choices that are specific for that option.

Figure 2A:
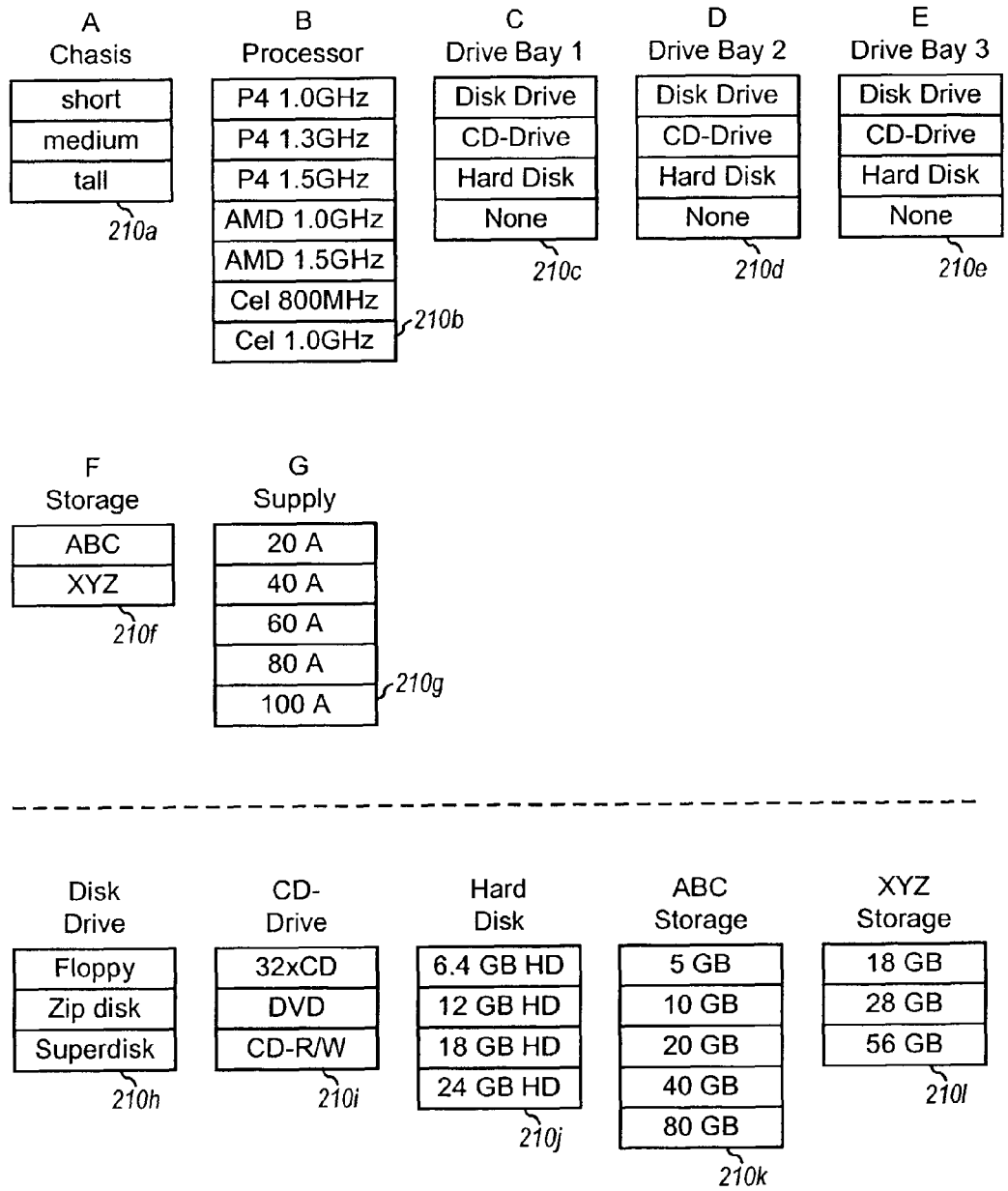
FIG. 2A shows a number of feature tables used to list available choices for top-level options of the computer system.

FIG. 2A shows a number of "feature" tables 210a through 210g that may be used to list the available choices for top-level options A through G, respectively, of computer system 100. For example, feature table 210a lists the available choices for the Chassis option as short, medium, and tall. Each remaining feature table 210b through 210g similarly lists the available choices for an associated top-level option. The "parent" feature tables 210a through 210g are shown above the dashed line, and the "child" feature tables 210h through 210j are shown below the dashed line.

Each of top-level options C through E (i.e., Drive Bays 1, 2, and 3 of computer system 100) may be configured to hold one of three possible choices (Disk Drive, CD-Drive, and Hard Disk components) or nothing. Each of these three components may be associated with one or more sets of choices (only one set of choices is shown for each component for simplicity). Thus, FIG. 2A also shows feature tables 210h through 210j that list the available choices for the Disk Drive, CD-Drive, and Hard Disk components, respectively. Similarly, top-level choice F (i.e., Storage) may be configured to hold an "ABC" or "XYZ" storage component or nothing. FIG. 2A further shows features tables 210k and 210l that list the available choices for the ABC and XYZ storage components, respectively.

During the configuration process for computer system 100, one of the available choices for each top-level option may be selected. A default value may also be assigned to each top-level option and may be used as the initial choices or if no selection is received for the option. The combination of the default and selected choices for all top-level options comprises a specific configuration for system 100. In a typical conventional implementation, once the choices for all options have been selected, the resultant configuration may be validated.

FIG. 2B shows a configuration table 250 (which is sometimes referred to as a validation matrix) that may be used to represent all possible valid configurations for computer system 100. Table 250 includes a number of columns, one column for each possible (top-level and sub-level) option of computer system 100. Each row of table 250 includes a specific set of values for the listed options. To validate a particular configuration based on the configuration table, the set of default/selected choices for the configuration may be compared against the rows of table 250. If a row includes the same set of choices as the default/selected choices, then that configuration is deemed to be valid. As can be imagined, the number of entries (i.e., rows) in table 250 may be very large for a complicated entity with many options and choices.

In the above example, some of the top-level options (e.g., Drive Bays 1, 2, and 3) share the same common options (e.g., Disk Drive, CD-Drive, and Hard Disk), each of which may be represented with a respective set of one or more feature tables. If these common options are extracted and separately modeled, then the amount of data that needs to be maintained for valid configurations may be reduced.

In many instances, constraints and rules may be applied to configuration of a complicated entity (e.g., computer system 100). As some examples, a vendor may only support a subset of the available processors for a short chassis, all three drive bays may be available only for medium and tall chasses, a power supply of a particular rating is required for each available model of storage device, and so on. If the relationship between different options can be effectively modeled, then the amount of data that needs to be maintained for valid configurations may also be reduced.

The invention provides techniques to configure complicated entities using sub-configuration, which provides numerous benefits. Sub-configuration effectively partitions the overall configuration of a complicated top-level entity (e.g., computer system 100) into a set of configurations of smaller sub-level entities (e.g., Drive Bays 1, 2, and 3) in combination with a less complicated configuration of a "simplified" top-level entity. The top-level entity may be represented by and configured via a parent model, and each sub-configurable component (or sub-level entity) may be represented by and configured via a child sub-model.

With sub-configuration, a complicated entity may be more efficiently modeled, configured, and validated. Each sub-configurable option of the entity may be configured and validated via a respective child sub-model. Generally, sufficient information is made available to the child sub-model such that the associated option can be validly configured. The required information may be provided from the parent level, queried and entered at the sub-level via the child sub-model, and/or provided via some other mechanisms.

An interactive user interface (or screen) may be used to support sub-configuration such that feedbacks can be provided at the sub-level. The feedbacks may be a warning of an invalid configuration, a suggestion for new selections to obtain a valid configuration, and so on. In this way, configuration errors may be localized, flagged as they occur, and remedied immediately. The feedback mechanism also reduces the likelihood of invalid choices propagating through the configuration process.

Once a sub-configurable option has been configured and validated, the parent model may be returned to, and any information from the sub-model that may be needed by the parent model is made available to the parent. Upon a return from the sub-level, or whenever directed, the parent model can be run (i.e., executed) in the context of all options that have been selected or configured. This allows the parent model to be validated with any new configuration made at the sub-level.

Sub-configuration further simplifies the data modeling for configuring complicated entities. With sub-configuration, shared options (e.g., Drive Bays 1, 2, and 3) may be extracted and modeled with a single sub-model or a set of sub-models. Each sub-model may be referenced and instantiated as needed by any of the common options. The sub-models reduce the amount of redundancy by localizing data and logic needed to represent the common options, and further simplify the data structure and logic for the top-level entity.

In essence, sub-configuration may be used to exploit common data patterns in a comprehensive configuration table. In this way, valid configurations for a complicated entity may be represented using a set of smaller tables. In one implementation, these smaller tables may be "localized" and some of these smaller tables may reside at the parent model and the remaining smaller tables may be included in the sub-models. In another implementation, these smaller tables may be "globalized" and shared between the parent model and sub-models. These implementations are described in further detail below.

Multiple levels of sub-configuration may be supported. In this case, each child sub-model may be a parent model that includes one or more child sub-models. In the following description, the parent model (or top-level) corresponds to the current level being configured, and the child sub-models (or sub-level) correspond to a lower level that may be configured using sub-configuration. The current level may also be the sub-level of a higher level.

Each child sub-model may also be viewed as an independent model. In such a design, the child sub-model may represent a particular entity (i.e., a component may be viewed as an entity) and may be used independently of the parent model or other sub-models to configure that particular entity. Each sub-configurable option may thus be configured and validated individually and independently.

Sub-configuration may be implemented in various manners and based on various data modeling structures. In one implementation, data for the parent model and child sub-models is localized, and parameter values may be (bi-directionally) passed between the parent model and child sub-models such that configuration may be achieved at both levels. In an embodiment, each sub-model includes one or more features mapped from the parent model, and a value for each mapped feature that affects configuration at the sub-level may be passed from the parent model to the sub-model. Correspondingly, values needed by the parent model may be returned from the sub-model after configuration of the child is completed.

In another implementation, data for the parent model and child sub-models is globalized. In this implementation, the tables used for configuration at both the top-level and sub-level are available to the parent model and sub-models. This globalized data modeling structure can provide certain advantages as described below. These two sub-configuration implementations and data modeling structures are described below.

Sub-Configuration Using Feature Mapping

In one implementation for sub-configuration, which uses mapped features, parameter values needed for configuration and validation at the parent model and child sub-models are passed between these two levels. Each sub-model is provided with sufficient information needed to configure and validate the option represented by that sub-model. Some of the required information may be obtained at the parent model and passed to the sub-model as mapped features. Other information may be collected in the sub-model. Upon returning from the child sub-model to the parent model, values for the mapped features are returned from the child sub-model to the parent model.

Figure 3A:
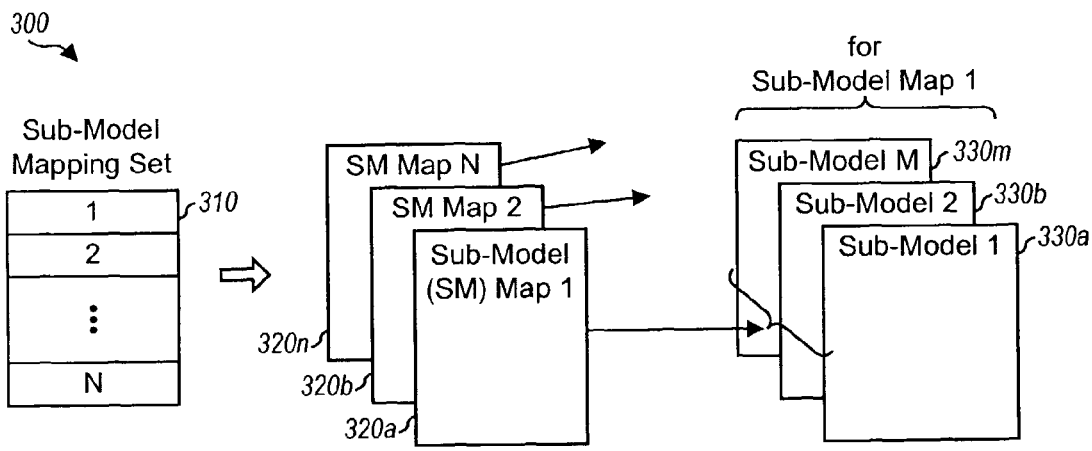
FIGS. 3A and 3B show a data modeling structure that supports sub-configuration using mapped features.

FIG. 3A shows a data modeling structure 300 that supports sub-configuration using mapped features. Structure 300 supports mapping of features between the parent model and child sub-models to perform sub-configuration, as described below. The mapped features are akin to parameters that may be bi-directionally passed between the parent model and child sub-models.

As shown in FIG. 3A, structure 300 includes a sub-model mapping set 310 that includes a number of (N) elements, one element for each sub-configurable option a the top level. For example, sub-model mapping set 310 may include four elements for options C, D, E, and F (i.e., Drive Bays 1, 2, and 3 and Storage) of computer system 100. Each element of mapping set 310 is associated with a respective sub-model map 320. For example, option F (Storage) may be associated with a sub-model map that includes the two available types of storages devices ("ABC" and "XYZ"). Similarly, option C (Drive Bay 1) may be associated with a sub-model map that includes the three available drive types (Disk Drive, CD-Drive, and Hard Disk). Each sub-model map 320 may further be associated with a set of (M) sub-models 330, where M may be one or greater. For example, the sub-model map for option F (Storage) may include a first sub-model for the ABC storage device and a second sub-model for the XYZ storage device.

Figure 3B:
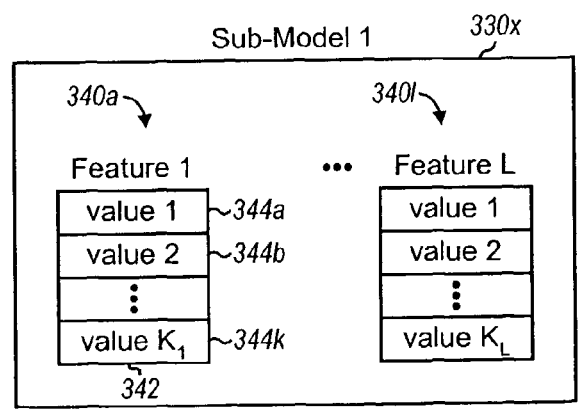

FIG. 3B shows an embodiment of a sub-model 330X, which may be one of several that may be used for a particular sub-model map 320. In general, sub-model 330X includes sufficient information needed to configure the option represented by that sub-model. In the embodiment shown in FIG. 3B, sub-model 330X includes a set of (L) features 340, where L can be one or greater. The first feature 340a may include the available choices for the option represented by that sub-model. Each additional feature may represent either a "mapped" feature from the parent model or a "local" feature of that sub-model. A mapped feature in the sub-model corresponds to a feature in the parent model, and may be used for validation of the sub-model. A local feature in the sub-model may be used to further configure the option represented by the sub-model, and typically does not affect the configuration at the parent model.

Each feature 340 is associated with a feature mapping set 342, which includes a set of (K) feature map values 344, where K can be one or greater. Feature mapping set 342 represents the set of possible choices for that feature 340 in the sub-model 330X, and each feature map value 344 represents a specific choice for the feature. Feature tables 340 of sub-model 330X may represent different types of information and may be used in a number of different ways, as described below.

In general, if multiple levels of sub-configuration are supported, each sub-model may be a parent model that includes selectable and/or sub-configurable options. One local feature table may be provided for each selectable option in the sub-model, and one sub-model mapping set and its associated sub-models may be provided for each sub-configurable option in the sub-model. Each sub-model may thus be a model that is independent of the parent model and other sub-models, and may be individually and separately configured and validated. The dependency between the sub-model and parent model may be modeled and expressed via the mapped features and the passed parameter values, as described below.

The use of sub-models for top-level sub-configurable options can both significantly reduce the amount of data needed to be stored for a complicated entity and further simplify the maintenance of the configuration information. The common features and configuration rules for the entity may be extracted and represented using smaller sub-models. For example, the same set of possible options may be available for each of Drive Bays 1, 2, and 3 of computer system 100. These options may be extracted, and each option may be modeled using a single sub-model. The proper sub-model may then be instantiated to configure each of the Drive Bays. Without sub-modeling, each of the Drive Bays would need to include all three possible options, and a total of nine options would need to be represented in the parent model for the three Drive Bays. With sub-modeling, only three options needs to be represented. The potential saving and simplification are more dramatic as the number of top-level options (e.g., Drive Bays) increases.

Figure 4:
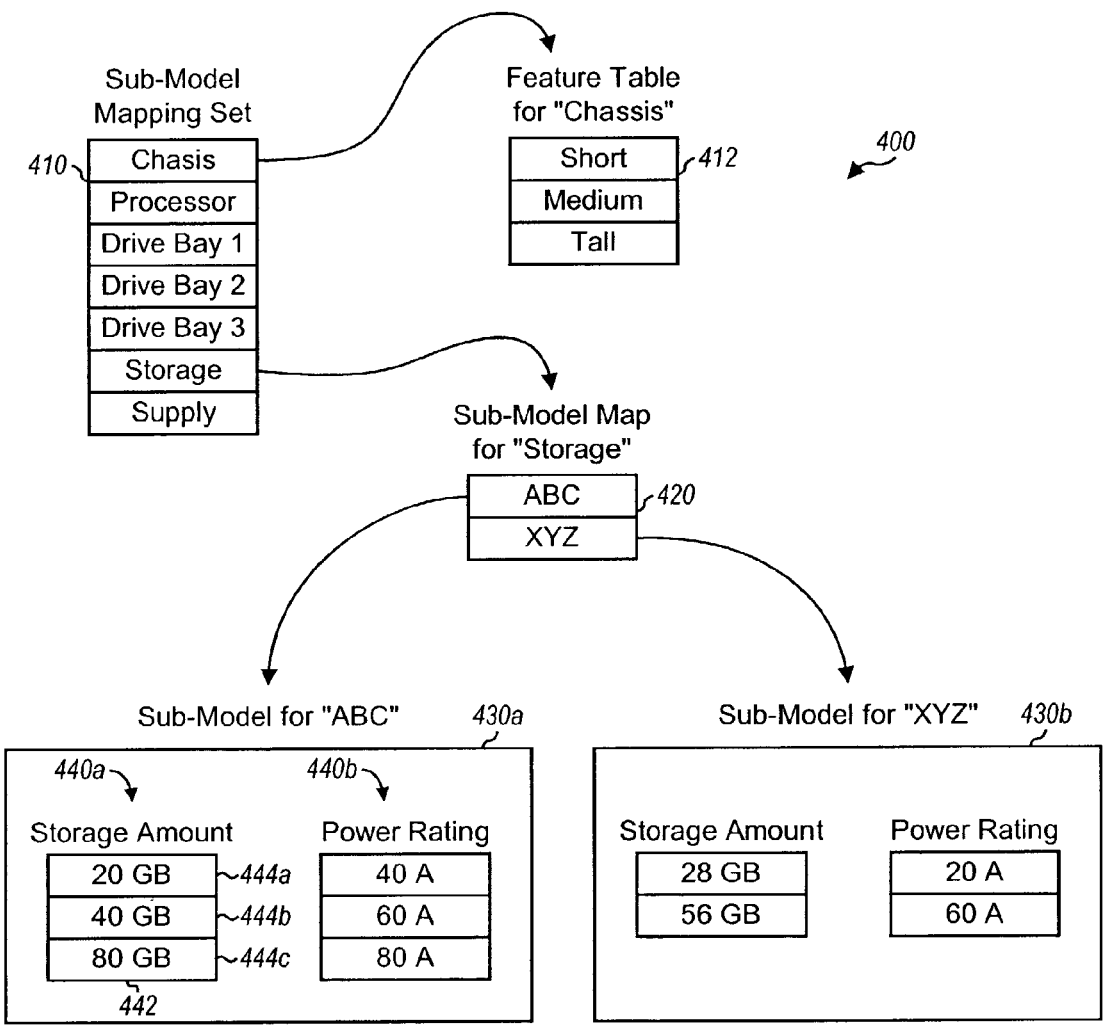
FIG. 4 shows an implementation of the data modeling structure in FIGS. 3A and 3B for the computer system.

FIG. 4 shows a portion of a data modeling structure 400 that may be used to represent computer system 100. Structure 400 is a specific implementation for a specific entity, and is provided to more clearly describe the more general structure 300 shown in FIGS. 3A and 3B. The portion of structure 400 shown in FIG. 4 includes the sub-model map for the Storage option and the two sub-models for the Storage sub-model map.

As shown in FIG. 4, structure 400 includes a sub-model mapping set 410 that includes seven elements, one element for each of the sub-configurable options and components of computer system 100. In this example, the parent model includes three features that are configurable at the parent level (i.e., Chassis, Processor, and Supply), one sub-configurable option that can be configured with a sub-model (i.e., Storage), and three sub-configurable options that can each be configured with the same sub-model (i.e., Drive Bays 1, 2, and 3). Each element of mapping set 410 is then either associated with a sub-model map or a feature table. For example, option F (Storage) may be associated with a sub-model map 420 that includes the two available types of storages devices, ABC and XYZ. Sub-model map 420 is further associated with two sub-models 430a and 430b, one for each type of storage device.

In the example shown in FIG. 4, sub-model 430a for the ABC storage/device includes two mapped features 440a and 440b for Storage Amount and Power Rating, respectively. The Storage Amount feature 440a represents the storage sizes available for the ABC storage device, and the Power Rating feature 440b represents the power rating/requirements for the corresponding storage sizes. Each feature 440 includes a respective feature mapping set 442, which includes a set of feature map values 444. For example, the feature map values for the Storage Amount feature 440a for the ABC sub-model 430a are 20 gigabytes (GB), 40 GB, and 80 GB, and the corresponding feature map values for the power rating feature 440b are 40 Amperes (Amp), 60 Amp, and 80 Amp. Sub-model 430b for the XYZ storage device is similar to sub-model 430a for the ABC storage device, but includes different values for the mapped features.

As shown in FIG. 4, the selectable options at the parent model (e.g., Chassis, Processor, and Supply) may each be associated with a respective feature table (similar to that shown in FIG. 2A) having a set of possible choices for that option. For example, the Chassis option is associated with a feature table 412 that lists the available choices for this option. For selectable options, sub-configuration is not required.

Sub-configuration may be implemented and supported using the sub-models described above in which one or more features in the parent model may be mapped to the child sub-models and used at the sub-level for validation. With "feature linkage" between the parent model and child sub-models, any number and combination of top-level features (or options) may be mapped to a particular sub-model and used to define (or enumerate) relationships between the mapped features and possibly other features in the sub-model. Each mapped feature in the sub-model may correspond to a respective feature table for a top-level option (e.g., such as the feature tables shown in FIG. 2A). For example, the Storage Amount mapped feature 440a in sub-model 430a corresponds to the ABC Storage feature table 210k in FIG. 2A, and the Power Rating mapped feature 440b corresponds to the Supply feature table 210g. Additional features may also be mapped to sub-models 430a. For example, the Chassis option may also be mapped as a feature of sub-model 440. This may be done, for example, if the available storage devices are affected by the size of the chassis (e.g., the 80 GB device is only available with the tall chassis). In general, each sub-model can have a different number of feature tables (i.e., a different set of features), and each feature table can further have a different number of selections. In an embodiment, the number of mapped tables for all sub-models of a particular sub-model map for a particular sub-configurable option is the same.

In one embodiment, the mapped features 440 in a sub-model 430 may be used to enumerate relationships between the various features in the sub-model. For example, sub-model 430a for the ABC storage device indicates that the power rating for the 20 GB device is 40 Amp, which implies that a power supply of 40 Amp or more is needed. Similarly, power supplies of 60 Amp (or more) and 80 Amp (or more) are needed for the 40 GB and 80 GB devices, respectively. Thus, in the configuration of the ABC sub-model, a value (e.g., 40 Amp) that has been selected for the Power Supply option G at the parent model may be passed down to the sub-model. If a particular storage amount is selected (e.g., 40 GB), then the corresponding power rating is determined (e.g., 60 Amp) and compared against the selected power supply (e.g., 40 Amp). In this case, since the selected power supply is inadequate for the selected storage amount, feedback may be provided immediately so that the user may select either another storage amount (e.g., 20 GB) or another power supply (e.g., 60 Amp or more). The tables (or feature mapping set) for the mapped features may thus be used to enumerate relationships that are used to validate configuration at the sub-model. The feature map values may be returned to the parent model upon leaving the sub-model.

In an embodiment, "name-binding" is used to simplify the passing of parameters between the parent model and child sub-model. With name-binding, the values for the mapped features in the sub-model match those in the feature table for the parent model, and the feature map values in the sub-model are further restricted to the set of possible values included in the corresponding feature table of the parent model. For example, the 40 Amp, 60 Amp, and 80 Amp values in Power Rating feature 440*b* corresponds to the identical 40 Amp, 60 Amp, and 80 Amp values in Power Supply feature table 210*g*. Alternatively, the feature map values are not restricted to a defined set of possible values and may take on any values. For this embodiment, comparison logic may be used to define the relationships between mapped features.

The values included in a mapped feature may represent a subset of all possible values for that feature. In an embodiment, only valid selections are listed in the sub-models. For example, 5 GB and 10 GB storage devices may also be available, but these devices may not be associated with any enumerated relationships, e.g., if these devices may be installed in any computer system. Thus, it may not be necessary to include these values in the sub-model.

In an embodiment, "late-binding" of features in the parent model and sub-model is supported. With late-binding, the parent model may refer to a feature of a sub-model without the need to specifically identify the sub-model. For example, the parent model may need to know the storage amount of the selected storage device, but does not need to know the particular type of storage device. This may be achieved, for example, by a call convention ("Storage:StorageAmount") used for the parent model. Then, depending on whether the ABC or XYZ storage device is selected, the selected storage device type may be substituted when the call is made (e.g., "ABC:StorageAmount"). With late-binding, a particular feature (e.g., Storage) of the parent model needs not be binded to any particular sub-model until the parent model is executed. Late-binding can thus be used to provide values may be used in the validation of the parent model (e.g., to check that there is sufficient storage for a selected processor).

Data modeling structure 300 shown in FIG. 3 also supports flexible child instantiation. Each top-level sub-configurable option may be defined with a set of possible children for that option. For example, the Drive Bays 1, 2, and 3 options may each be configured with a Disk Drive, a CD-Drive, or a Hard Disk, and the Storage option may be configured with an ABC or XYZ storage device. Each of these components is a sub-configurable option that is represented with a respective sub-model. A particular component may be selected for each sub-configurable option, in which case the sub-model for the selected component may be instantiated for the option. Thus, any sub-model may be instantiated any number of times, as allowed by the parent model. For example, all three Drive Bays may be configured with hard disks and three instances of the Hard Disk sub-model would then be created, if such configuration were allowed for the computer system.

Implementation of the sub-models with mapped features as described above results in a localized data modeling structure. Each sub-model includes mapped and local features that are needed for the configuration and validation of that sub-model. The local features may not be accessible by other sub-models or the parent model. In an embodiment, "sub-model linkage" is used and the mapped features are explicitly enumerated at both the parent and child levels. In an embodiment, the set of choices for each mapped feature is also explicitly enumerated.

Figure 5:
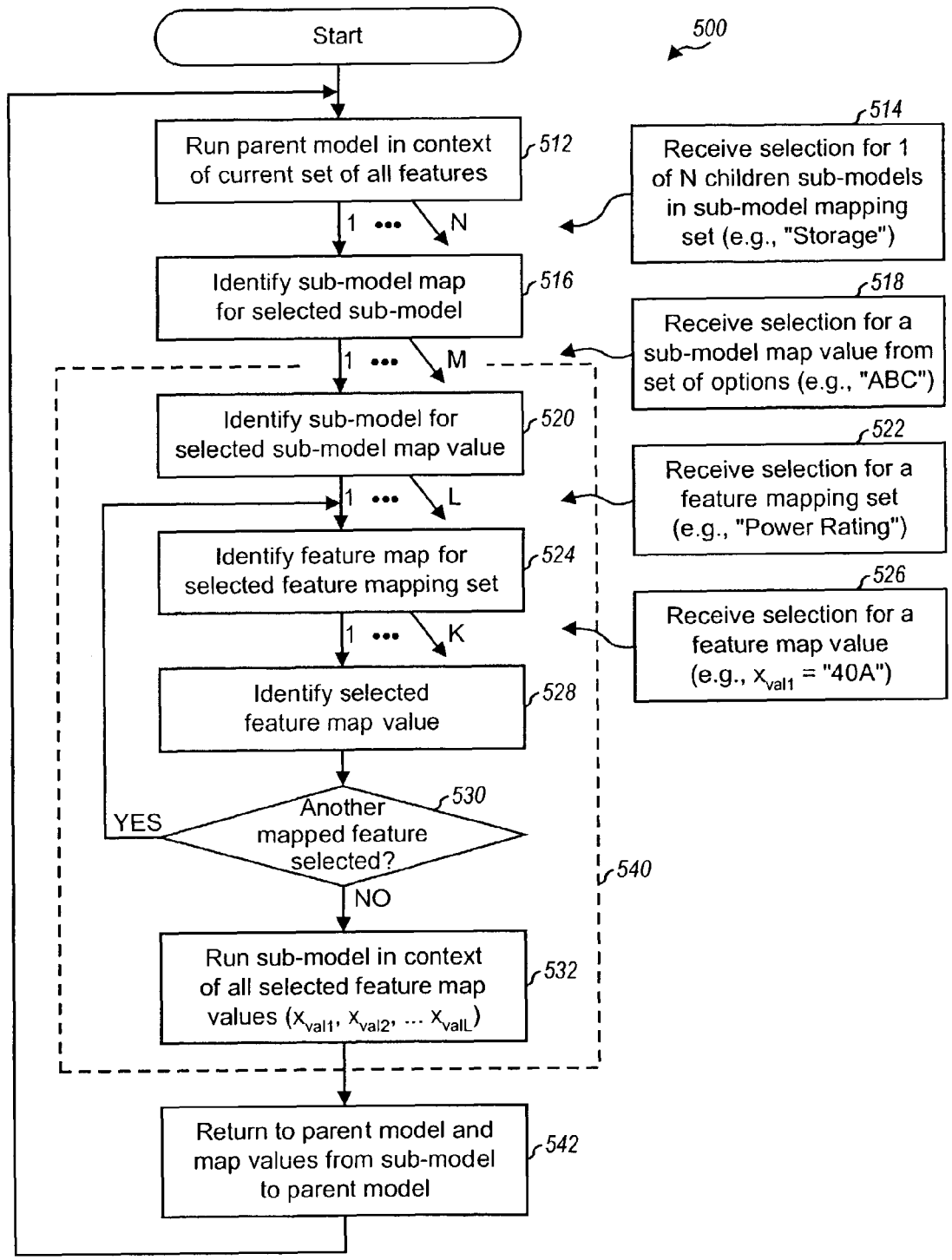
FIG. 5 is a flow diagram of a process that supports sub-configuration using mapped features, in accordance with an embodiment of the invention.

FIG. 5 is a flow diagram of a process 500 that supports sub-configuration in accordance with an embodiment of the invention. Process 500 may be used to configure and validate a complicated entity using sub-configuration based on feature mapping between the parent model and child sub-models. Initially, the parent model is executed in the context of a current set of all features, at step 512. For the example shown in FIG. 1, the parent model may represent the computer system and the set of all features may represent the selectable and sub-configurable options.

In the parent model, a selection is received for one of N child sub-models included in a sub-model mapping set, at step 514. The sub-model mapping set typically includes the sub-configurable options for the parent model (e.g., Drive Bays 1, 2, 3, and Storage for computer system 100). The selected child sub-model may be, for example, the Storage option of the computer system. In response to receiving the sub-model selection, a sub-model map for the selected sub-model is identified, at step 516. For example, the Storage option may be associated with sub-model map 420 shown in FIG. 4.

A selection for a particular sub-model map value is then received from among a set of M possible options, at step 518. For example, the ABC selection may be received from the set that includes two possible choices of ABC and XYZ. In response, a sub-model is identified for the selected sub-model map value, at step 520. For example, the ABC sub-model map value may be associated with sub-model 430*a* shown in FIG. 4.

A selection for a particular feature mapping set is received from among L possible mapping sets (e.g., the Power Rating feature mapping set), at step 522. The feature map for the selected feature mapping set (e.g., feature map 440*b* in FIG. 4) is then identified, at step 524. For this feature map, a selection for a particular feature map value from among K possible values is received, at step 526. In this case, the selected feature map value (e.g., "40 Amp") is identified from among the possible values (e.g., 40 Amp, 60 Amp, and 80 Amp) in the feature mapping set, at step 528.

At step 530, a determination is made whether or not another mapped feature has been selected. If the answer is yes, the process returns to step 522 and a selection for another feature mapping set (e.g., Storage Amount) may be received and processed. Steps 522 through 530 may be repeated any number of times to enter and modify the feature map values for any number of mapped (and local) features in the selected sub-model.

Once the desired feature map values have been entered, the selected sub-model (e.g., for the Storage option) is executed in the context of all selected feature map values (e.g., "40 Amp" and possibly others), at step 532. This execution in the child sub-model may be used to validate the selected values for the features included in the sub-model. In an embodiment, the validation is performed for the entire sub-model and is executed whenever a selection changes.

The steps within block 540 perform the sub-configuration for the selected sub-model. If the configuration for the sub-model is not valid, feedback can be provided at the sub-level (e.g., via a warning or error message), and the process may return to the sub-model at step 520 (not shown in FIG. 5). The invalid configuration for the sub-model can be thus modified at this point, e.g., by selecting another value for each feature that causes the invalid configuration. The sub-model may then be re-executed with the new values. The steps within block 540 may thus be repeated as many times as necessary or desired.

Once the sub-model has been executed and the configuration at the sub-model has been validated, the process returns from the sub-model to the parent model, at step 542. The values for the mapped features (e.g., Storage Amount and Power Rating) are also passed from the sub-model to the parent model, which may thereafter use these values to perform validation at the parent model.

Upon returning to the parent model, at step 512, the parent model may be executed in the context of all features, including the new features just configured at the sub-model. Values for the mapped features, which may have been selected or configured in the sub-model, are mapped to and replace the corresponding values in the parent model. Execution of the parent model performs validation at the parent model to ensure that the configuration just made at the sub-model, although valid for the sub-model, is also valid at the parent model. Again, feedback can be provided if the configuration at the parent model is invalidated by the sub-configuration of the sub-model.

In the flow diagram shown in FIG. 5, N, M, L, and K may each be any integer one or greater.

Sub-configuration thus allows a complicated entity to be configured in smaller portions and incrementally, one component at a time. As shown in FIG. 5, a particular option may be configured using sub-configuration and validated. The parent model is then validated based on the current set of features, which includes those for the sub-configured option. Another option may then be configured using sub-configuration and validated. The parent model is then validated based on the new current set of features.

Although not shown in FIG. 5 for simplicity, selectable options may also be configured. Selectable options may be those for which a set of choices is provided, and one of the choices may be selected from the set. For example, the selectable options for computer system 100 may include the Chassis, Processor, and Supply options that are associated with the set of possible choices shown in feature tables 210*a*, 210*b*, and 210*g*, respectively, in FIG. 2A. Upon selecting a particular choice for a selectable option, the parent model may be executed, similar to that performed after returning from a sub-model.

In an embodiment, the validity of a particular configuration for the parent model is determined by whether or not that combination of selected choices for the components and sub-configurable options exists in a validation table. If a match is not found in the validation table, then a match is looked for in an exception table. The exception table includes "incorrect" combinations and messages as to why the combinations are incorrect. As an example, a new Power Supply may be selected which invalidates a previous selection for the Storage option. In this case, the configuration is incorrect because the selected choices for the Power Supply and Storage are inconsistent. Either could be changed to fix the problem. But to change the Storage, a user can jump to the sub-model in order to make changes. When configuration of the sub-model is finished, the parent model can be validated once more to determine if the entire model is now valid.

Sub-Configuration Using Global Data Model

In another implementation of sub-configuration, data in the parent model and child sub-models is globally maintained and can be referenced by both levels. This data model can provide various advantages, as described below.

For the computer system example shown in FIG. 1, the parent model may include feature tables for the selectable options (e.g., Chassis, Processor, and Supply). Each sub-configurable option (e.g., Drive Bays 1, 2, and 3, and Storage) may be associated with a number of possible choices, each of which may be represented with a child sub-model. Each child sub-model may be associated with a set of tables, similar to that described above. In an embodiment, the parent model may reference the features and feature values in the sub-models, if and when needed. In this embodiment, the child sub-models can be implemented independent of the parent model. In an alternative embodiment, the features and feature values in the parent model may be referenced by the sub-models, if and when needed. For this embodiment, the child sub-models can reference the parent model or sibling sub-models via the user interface. In either embodiment, the parent model may reference the feature tables associated with the sub-models. Access of the values in these feature tables may be achieved via the names of the sub-configurable options (e.g., using the convention "Storage:StorageAmount", where Storage is a symbolic reference to the actual model for the ABC storage component).

Figure 6:
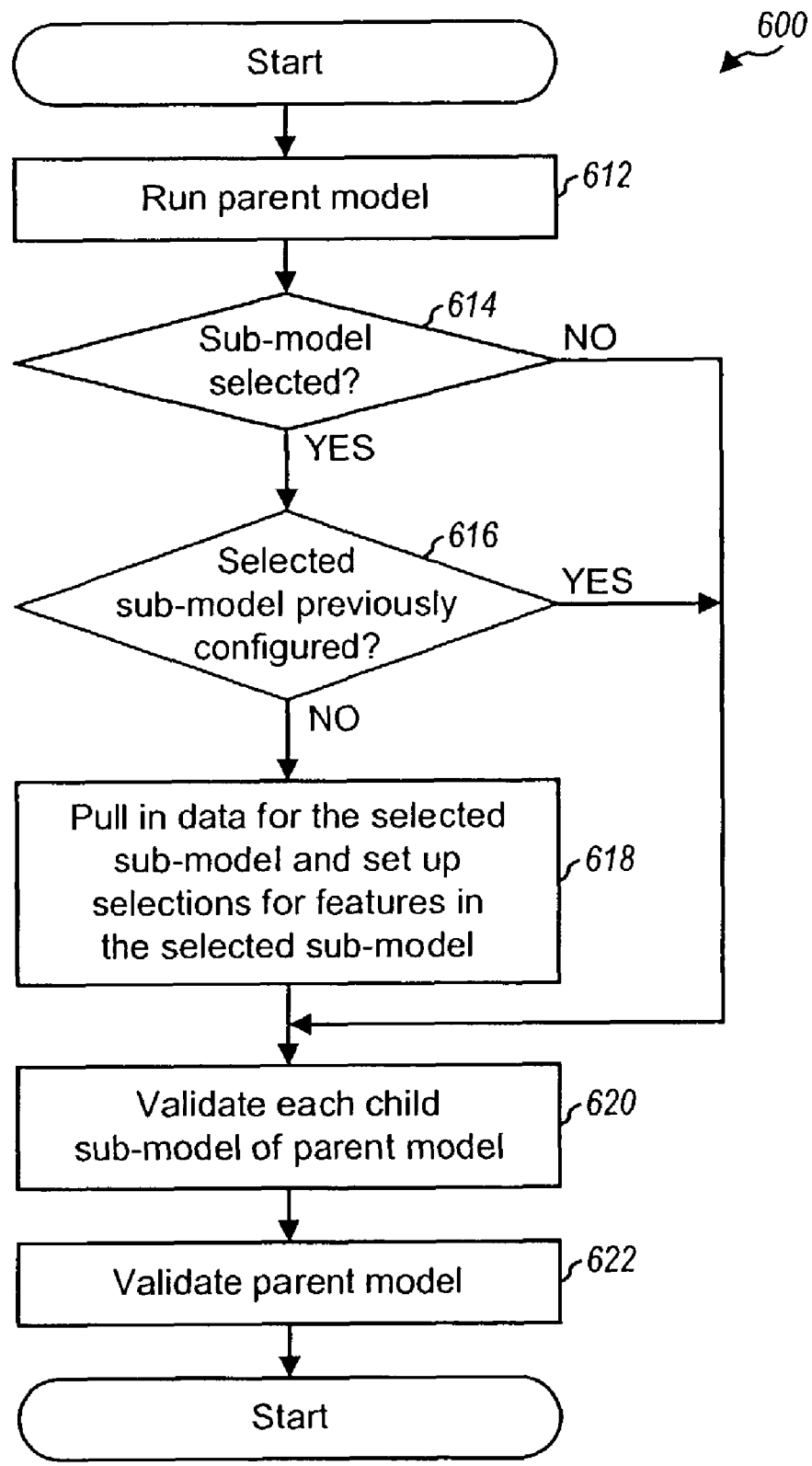
FIG. 6 is a flow diagram of a process that supports sub-configuration using globalized feature tables, in accordance with a embodiment of the invention.

FIG. 6 is a flow diagram of a process 600 that supports sub-configuration in accordance with another embodiment of the invention. Process 600 may be used to configure and validate a complicated entity using sub-configuration based on a globalized data modeling structure.

Initially, the parent model is executed in the context of a current set of all features, at step 612. In the parent model, a determination is made whether or not a particular child sub-model (e.g., the Storage option) has been selected, at step 614. If no sub-model has been selected, the process proceeds to step 620. And if a sub-model has been selected, a determination is made whether or not the selected sub-model has been configured previously, at step 616. If the answer is yes, then the process proceeds to step 620.

If the selected sub-model has not been configured, data for the selected sub-model is pulled in and selections for features in the sub-model are set up, at step 618. In an embodiment, default values are passed from the parent model to the sub-model if the sub-model has not been configured previously. The default values may be used for the features in the selected sub-model to simplify the configuration process. For example, the default value for the Storage option may be an ABC storage device of 40 GB, the default value for the Drive Bay 1 option may be a Floppy, the default value for the Drive Bay 2 option may be a 32×CD drive, and the default value for the Drive Bay 3 option may be a 6.4 GB hard drive. Data for the selected sub-model may be pulled in by first identifying default values for the selected sub-model and then overriding any defaults that are defined by the parent model. In an embodiment, only required (e.g., mapped) values are passed from the parent model to the selected sub-model.

The parent may also specify which selections are to be used for the sub-model through a naming convention. This is akin to setting up to pass values (i.e., mapped values, if featuring mapping is used) from the parent model to the sub-model. Step 618 effective adds the child sub-model into the validation loop for the parent model.

In an embodiment, the selection of a sub-model does not affect the user interface (or screen) for the parent model. Instead, the default values are simply pulled into the parent model and further entered for that sub-model. In this way, data for the parent model "accretes" as more sub-model are selected for configuration.

In an embodiment, a sub-model is instantiated upon selection of a sub-configurable option in the parent model. For example, each of the sub-configurable options (e.g., Drive Bays 1, 2, and 3) may be initially set as empty (the default value), and the sub-model for a sub-configurable option may be instantiated upon selection. In an embodiment, the user interface for jumping to the child sub-model is achieved by mere switching of the user interface context.

Once the default and/or selected values for the selected sub-model have been provided to the sub-model, the parent model is executed in the context of all sub-models configured thus far. This may be achieved by validating each child sub-model of the parent model, at step 620. If a child sub-model of the parent model has other child sub-models, then these other child sub-models are validated first. The parent model is then validated in the context of all validated child sub-models, at step 622. The values from the selected sub-model are available to the parent model once validation occurs.

The navigation from the user interface for the parent model to the user interface for the child sub-model (or vice versa) may be achieved by switching user interface context. The transition of user interface can be basically achieved as follows: if there is a change in context for the user interface (e.g., from the parent model to child sub-model, or vice versa) then the user interface changes to show the new model or sub-model. Otherwise, no changes take place for the user interface. This change in user interface context simply changes which elements of the model are displayed at a given point. In an embodiment, navigation between the parent model and sub-model can be achieved via a link provided in the user interface for each level. If the default values for the selected sub-model are sufficient, then it may not be necessary to navigate to the sub-model. However, if additional configuration of the sub-model is desired or needed, then the link provided in the parent model user interface can be activated to jump to the sub-model.

In an embodiment, the user interface may be updated whenever a jump is made between the parent model and the child sub-model. This update may entail refreshing the sub-model user interface to include the defaults or parent values pulled into the sub-model. In another embodiment, the current values are shown for the model and sub-models regardless of the user interface context, and regardless of whether these values are defaults, set by the parent, or modified by the user.

The techniques described herein for sub-configuration may be used for various complicated entities. In one implementation, a set of top-level pages (i.e., a top-level or parent pageset) may be provided to represent a complicated entity. The parent pageset may include one or more components (or options), each of which may be selectable or configurable via a respective set of sub-level pages (i.e., a sub-level or child pageset). The children pagesets may include feature data and configuration rules for components of the parent pageset.

Multiple components of the parent pageset may share certain feature data and configuration rules. If these common components can be logically extracted and grouped together on a new set of child pages, then the pageset file size may be reduced and data maintenance may be simplified by consolidating feature data and associated configuration rules into a single location (i.e., the sub-level pageset). In this case, sub-configuration is a collection of one or more children pagesets that contain some feature tables and calculated results that may be used in the parent pageset. Without sub-configuration, the shared components would need to be replicated for each instance of the component in the parent pageset.

By extracting and representing the feature tables in one or more sub-level pagesets, the parent pageset can reference these feature tables without adding complexity to the data model. The parent pageset becomes simpler and this may help to improve the performance of the code engine.

Example Implementation

Figure 7A:
FIGS. 7A, 7B, and 7C show three screens of an example top-level pageset, a sub-level pageset, and a feedback pageset for a specific implementation that utilizes various aspects and embodiments of the invention.

FIG. 7A shows a screen of an example top-level pageset 700 that implements various aspects and embodiments of the invention. Top-level pageset 700 (i.e., the parent model) represents "Match-o-Rama", an entity that allows a user to describe himself or herself (You) and choose a Mate, a Child, one or more Cars, and a Home. The entity then determines whether or not the selections for these options are compatible (i.e., valid).

As shown in FIG. 7A, top-level pageset 700 includes a column 710 of top-level options under a heading of "Family". In top-level pageset 700, each person (You, Mate, and Child) and each Car is a sub-configurable option that is represented by a respective sub-level pageset (i.e., child sub-model). Each sub-level pageset includes a number of features and is associated with its own logic. The Home option is a selectable option that is associated with a feature table. Top-level pageset 700 further includes rules and logic that relate top-level and sub-level features to check for valid configurations.

Each sub-configurable option may be configured via its associated sub-level pageset (options corresponding to two sub-level pagesets are shown in a column 740). The number of Cars is selectable via a list box 720, and each of the selected number of Cars is represented with a respective icon 722. Each Car is configurable via a common sub-level pageset that may be shared for all Cars, as described below. The Cars option is equivalent to the Drive Bays option in the example shown in FIG. 1, and the number of Cars may be limited to a particular value (e.g., 10).

The selectable Home option is associated with a feature table that includes a set of possible choices. The choices for the Home feature table may be presented with a list box (as shown in FIG. 7A), a set of icons, or some other representation.

Top-level pageset 700 further includes a column 740 with a heading of "Compatibility". Column 740 illustratively includes a sub-level pageset 750*a* for the You sub-configurable option and a sub-level pageset 750*b* for the Mate sub-configurable option. In an embodiment, sub-level pagesets 750*a* and 750*b* are two instances of a common sub-level pageset that may be used to configure the You, Mate, and Child options. In another embodiment, separate sub-models are provided for male and female, and the You, Mate, and Child options may each be chosen to be either male or female. Each sub-level pageset 750 includes a number of features (e.g., Build, Age, Height, Eye, and Hair). Each of these features is associated with a respective set of choices, which may be presented with a list box (for the Build, Age, and Height features), a set of icons (for the Eye and Hair features), or some other representation. For each feature, any one of the available choices may be selected for the feature to configure the option.

Top-level pageset 700 further includes a section 730 that displays a mix of the results (outputs) from both the top-level and sub-level pagesets. Section 730 may be used to provide feedbacks for the configuration of the top-level and sub-level pagesets. In the example shown in FIGS. 7A through 7C, the incompatibility arises because the Cost of Cars ($112,500), which is derived by summing the Price values for all sub-configured Car option, is greater than the allowed percentage of total Income of all people (You, Mate, and Child), as shown in FIG. 7C. (The Income may be entered for each sub-model for a person as a feature. The feature may be selectable from any pageset for a sub-model feature.)

In an embodiment, a link is provided in the top-level pageset for each sub-configurable option. This link may be activated to jump from the top-level pageset to the sub-level pageset associated with the sub-configurable option. In an embodiment, for the selection of a particular sub-level pageset to configure a selected sub-configurable option, default values may be provided for one or more features of the sub-level pageset. These default values may be overridden by entering in other selections. In an embodiment, after the sub-configurable option has been configured, the values used for the configuration of the option are thereafter used for the sub-level pageset (until reset by the user).

As shown in FIG. 7A, a user interface (i.e., a screen) may be implemented to display the top-level pageset as well as one or more sub-level pagesets. This dual display allows the user to easily jump between the top-level pageset and a sub-model for a sub-configurable option, make changes to a configuration, and quickly see the result. Alternatively, the sub-level pageset may be presented in a separate screen, as shown below in FIG. 7B.

In an embodiment, the top-level pageset and each sub-level pageset in the screen is implemented with a respective frame. With this modular display, only the affected frame of the screen needs to be updated (or refreshed) when the user selects a new sub-configurable option. This can improve the rendering of the screen to provide a more enjoyable user experience.

Each sub-level pageset includes its own logic, which may be used to validate the configuration of the option represented by the sub-level pageset. Only certain configurations for the option may be valid, and the logic is used to validate the user selected values for the features of the option. The top-level pageset similarly includes its own logic, which is used to validate the configuration of the top-level options. The top-level pageset may also include logic that relates sub-level pagesets to each other, or the top-level pageset to sub-level pagesets.

For the dual display design shown in FIG. 7A in which both top-level and sub-level pagesets are displayed on the same screen, a selected sub-level pageset may be configured and validated and the top-level pageset may thereafter be validated in combination with the configured sub-level pageset. In this manner, feedback can be effectively provided as each top-level option is configured, which then improves the overall configuration process.

Figure 7B:
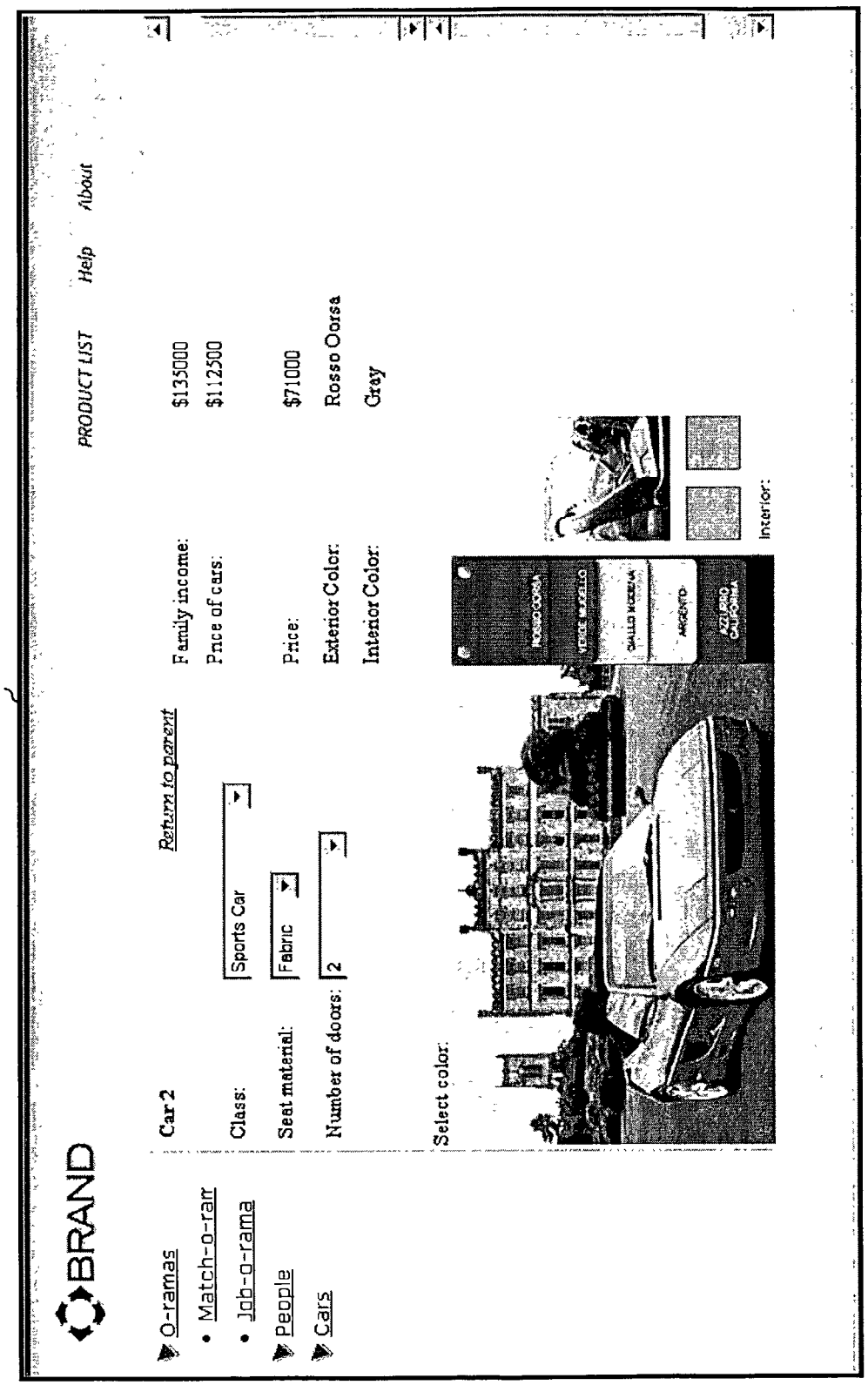
Figure 7C:

FIG. 7B shows a screen of an example sub-level pageset 780 for the Car sub-configurable option in top-level pageset 700. This screen may be displayed when the user jumps from the top-level pageset to the sub-level pageset for the Car option. In an embodiment, an administrator sets up which elements are shown on a given pageset. The administrator may choose to only reference items from one pageset or may include references to child sub-models and/or parent model (or sibling sub-models, and so on). A link may be added to the pageset that changes which pageset is displayed. The new pageset may represent a switch in context from the top-level pageset to the sub-level pageset, from the sub-level pageset to the top-level pageset, and so on. A link may be provided in the sub-level pageset to return to the top-level pageset.

Sub-level pageset 780 (a child sub-model) includes a number of features (e.g., Class, Seat Material, Number of Doors, Interior Color, and Exterior Color). Each of these features is associated with a respective set of choices, which may be presented with a list box (for the Class, Seat Material, and Number of Doors features), a set of icons (for the Interior and Exterior Color features), or some other representation. For each feature, any one of the available choices may be selected for the feature to configure the option.

Each sub-level pageset may further access values from the top-level pageset, such as the "Family Income" and "Price of Cars" values in sub-level pageset 780. These parent values may be used to guide the user in configuring the Car option (e.g., the Price for Cars should not exceed a particular percentage of the Family Income). Each sub-level pageset may also provide one or more values derived for the associated option based on the selected feature values. For example, the Car Price in sub-level pageset 780 is a value derived based on the selected feature values for the Car option. Upon validation of the top-level pageset, one or more values may be accessible to the top-level pageset. For example, the configured Price of the Car option may be used by the top-level pageset to update the Price of Cars value in the top-level pageset.

FIG. 7C shows portion of a screen 790 that may be displayed to show the selections for various options. In this example screen, the selected feature values for each sub-configurable option and each selectable option are shown on the screen.

Computer System

Figure 8:
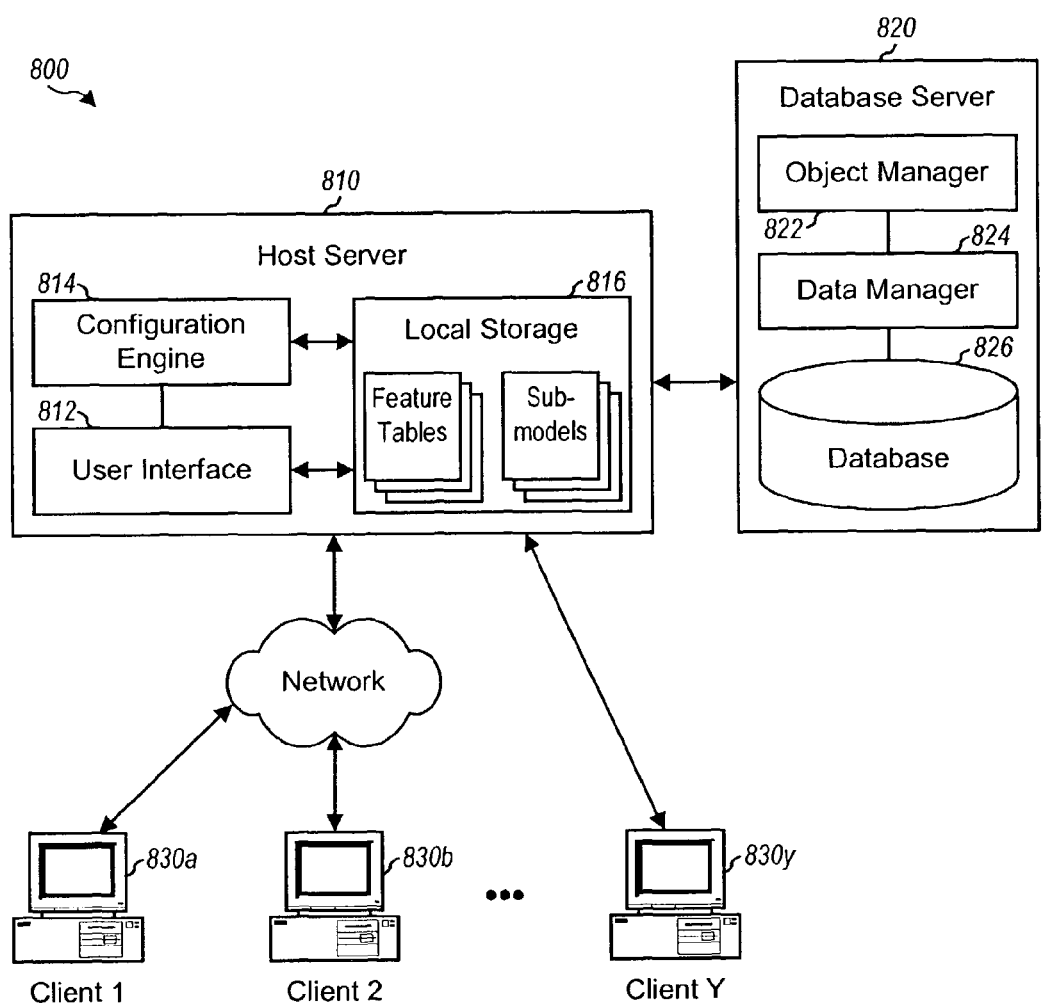
FIG. 8 is a simplified diagram of an embodiment of a configuration system that may be capable of implementing various aspects and embodiments of the invention.

FIG. 8 is a simplified diagram of an embodiment of a configuration system 800 that may be capable of implementing various aspects and embodiments of the invention. In this embodiment, configuration system 800 is implemented on a set of one or more host servers 810 that couple to and interact with one or more client computers 830 via direct connections, a computer network (e.g., the Internet), and/or some other means. Host server(s) 810 further couples to a database server 820 that stores data (typically in a "raw" form) used by the system.

In an embodiment, configuration system 800 includes a number of modules such as a user interface module 812 and a configuration engine 814. Additional, fewer, and/or different modules may also be included in configuration system 800, and this is within the scope of the invention. User interface module 812 provides the interface (e.g., screens such as those shown in FIGS. 7A through 7C) used to present information to an administrator and/or a user of the configuration system. User interface module 812 further receives and interprets user commands and data, which may be provided via mouse clicks, mouse movements, keyboard inputs, and other means. User interface module 812 then provides the received data and commands to other modules, which then perform the appropriate responsive action.

Configuration engine 814 facilitates the configuration of entities, as described above.

The modules within configuration system 800 may operate on and share the data stored in a central database 826. Typically, raw data from database 826 is retrieved by a module within configuration system 800 and processed into a form more suitable for that module. The processed data is then stored to a local storage 816 to allow for fast and efficient access to the data. In an embodiment, feature tables and sub-models used to configure entities may be stored in local storage 816. Local storage 816 may be implemented with a semiconductor memory (e.g., RAM, Flash), a hard disk, or some other data storage technology that can provide fast access to the data stored thereon.

In an embodiment, database server 820 manages the central database for configuration system 800 and includes an object manager 822, a data manager 824, and database 826. Object manager 822 manages the interaction with the database and, in an embodiment, includes business objects (BO), business services (BS), and business components (BC) (not shown in FIG. 8 for simplicity). The business objects model major entities (e.g., sub-models) in the configuration system with associated business rules. Each business object is made up of a hierarchy of parent-child components, which model relationship with appropriate specialized operations. The business services are the basic components for building complex behavior. New business services may be created and linked into multi-step control flows to provide complex behavior encompassing multiple business objects. The business components provide real time access to remote objects without replication of data within database 826. A business object may be made up of a number of business components managed by the configuration system.

Data manager 824 manages database 826 and performs this function by invoking SQL objects. Database 826 stores data for the configuration system, and possibly for other systems that may be combined with the configuration system to provide an overall system. The data for entities may be stored using the data modeling structure shown in FIG. 3 or some other structure. In this case, the feature tables and sub-models may be stored as objects in the database.

Figure 9:
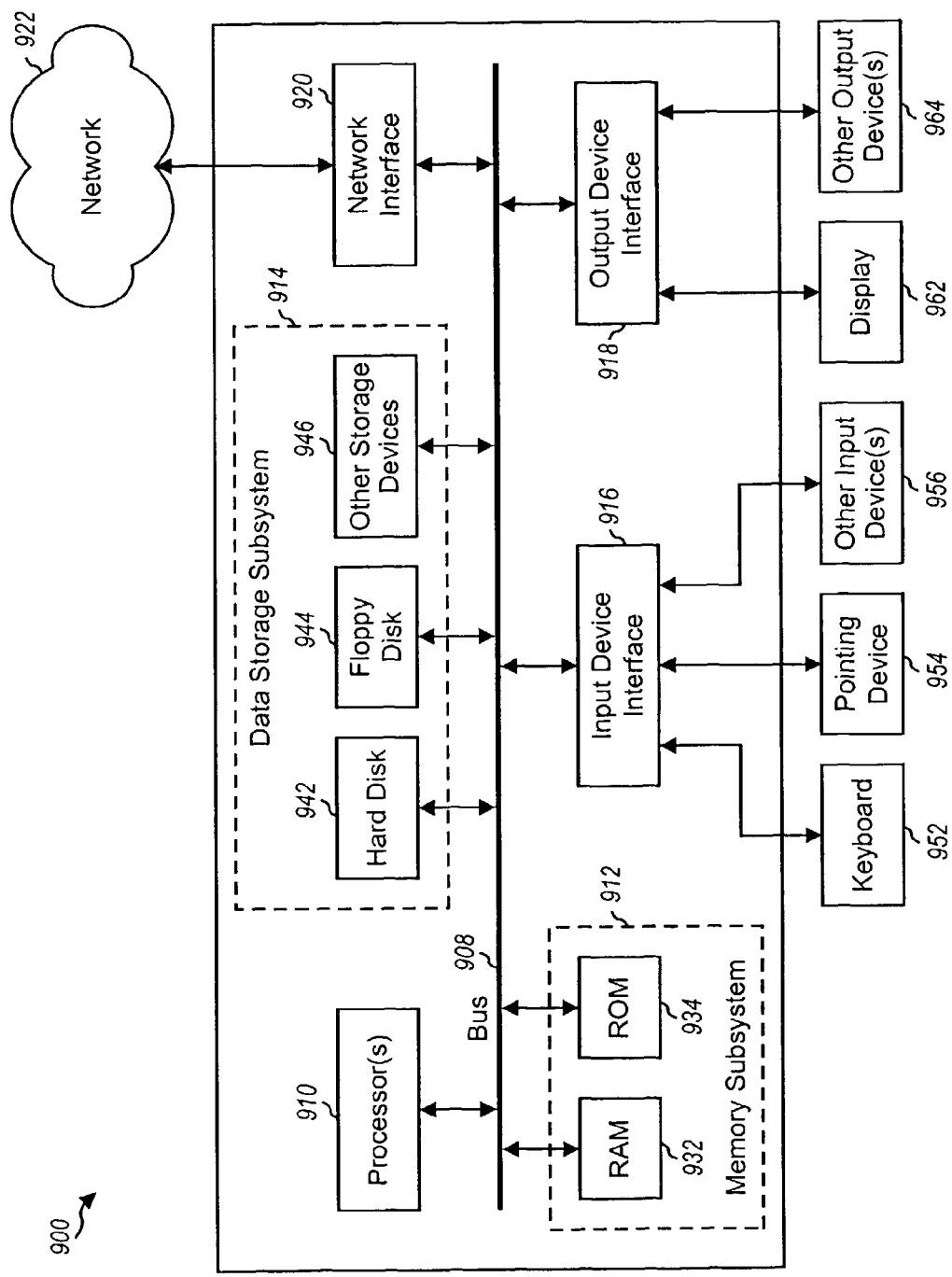
FIG. 9 is a block diagram of a computer system.

The configuration system described herein may be implemented using a "thick-client" model whereby software modules for the configuration system are installed on both the host server and client computers. The configuration system described herein may also be implemented using a "thin-client" model whereby software modules for the configuration system are installed only on the host server, and the client computers can access data and functionality from the host server via browsers executed on the client computers. The browser-based thin-client model can provide various advantages over the thick-client model including (1) ease of installation, since the software modules for the thin-client model are typically only installed on the host server and not on the client computers, (2) ease of maintenance, since upgrades and other maintenance tasks are performed only on the host server, (3) high level of connectivity, since any user with a browser and (web) access may be able to interact with the host server, and other benefits FIG. 9 is a block diagram of an embodiment of a computer system 900 that may be used to implement host server 810 or client computers 820. System 900 includes a bus 908 that interconnects major subsystems such as one or more processors 910, a memory subsystem 912, a data storage subsystem 914, an input device interface 916, an output device interface 918, and a network interface 920. Processor(s) 910 perform many of the processing functions for system 900 and communicate with a number of peripheral devices via bus 908.

Memory subsystem 912 may include a RAM 932 and a ROM 934 used to store codes and data that implement various aspects of the invention. In a distributed environment, the program codes and data may be stored on a number of computer systems and used by the processors of these systems. Data storage subsystem 914 provides non-volatile storage for program codes and data, and may include a hard disk drive 942, a floppy disk drive 944, and other storage devices 946 such as a CD-ROM drive, an optical drive, and removable media drive.

Input device interface 916 provides interface with various input devices such as a keyboard 952, a pointing device 954 (e.g., a mouse, a trackball, a touch pad, a graphics tablet, a scanner, or a touch screen), and other input device(s) 956. Output device interface 918 provides an interface with various output devices such as a display 962 (e.g., a CRT or an LCD) and other output device(s) 964. Network interface 920 provides an interface for system 900 to communicate with other computers coupled to communication network 922.

Many other devices or subsystems (not shown) may also be coupled to system 900. In addition, it is not necessary for all of the devices shown in FIG. 9 to be present to practice the invention. Furthermore, the devices and subsystems may be interconnected in configurations different from that shown in FIG. 9. One or more of the storage devices may be located at remote locations and coupled to system 900 via communication network 922. The operation of a computer system such as that shown in FIG. 9 is readily known in the art and not described in detail herein. The source codes to implement various aspects and embodiments of the invention (e.g., sub-configuration) may be operatively disposed in memory subsystem 912 or stored on storage media such as a hard disk, a floppy disk, or a CD-ROM that is operative with a CD-ROM player.

Headings are included herein for reference and to aid in the locating certain sections. These heading are not intended to limit the scope of the concepts described therein under, and these concepts may have applicability in other sections throughout the entire specification.

The foregoing description of the specific embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein, and as defined by the following claims.

What is claimed is:

1. A computer program product for performing sub-configuration of components of an entity, comprising a computer-usable storage medium having embodied therein computer-readable program codes executable by a processor to:
    configure a parent model, wherein
        an entity is configured using a parent model, and
        the parent model comprises a plurality of selectable features;
    if the plurality of selectable features comprises more than one instance of a subset of the plurality of selectable features, extract the subset of the plurality of selectable features;
    in response to the extracting, generate a sub-model of the parent model, wherein
        the sub-model comprises the subset of the plurality of selectable features,
        each of the plurality of selected features is mapped from the parent model to the sub-model, and
        at least one value required by the parent model is returnable from the sub-model to the parent model;
    select a particular sub-configurable component among a plurality of sub-configurable components of the entity, wherein
        the sub-configurable component is configured using the sub-model;
    identify the sub-model for the selected sub-configurable component, in response to the selection;
    configure the selected sub-configurable component by selecting at least one value for at least one selectable feature among the subset of the plurality of selectable features from the sub-model;

validate the configuration of the selected sub-configurable component based on the sub-model and the one or more values for the selected sub-configurable component; and output a result of the validation.

2. The computer program product of claim 1, wherein the computer-usable medium is further embodied with computer-readable program codes for
providing one or more values from the sub-model to the parent after validating the configuration for the selected sub-configurable component.

3. The computer program product of claim 1, wherein the computer-usable medium is further embodied with computer-readable program codes for
validating configuration of the entity based on
the parent model,
the validated configuration for the selected sub-configurable component, and
a value of a mapped feature returned from the sub-model to the parent model.

4. The computer program product of claim 1, wherein the computer-usable medium is further embodied with computer-readable program codes for
providing an indication of a result of the configuration for the selected sub-configurable component.

5. The computer program product of claim 1, wherein the computer-usable medium is further embodied with computer-readable program codes for
passing a first set of one or more values for a first set one or more features from the parent model to the sub-model for the selected sub-configurable component.

6. The computer program product of claim 5, wherein one or more default values are passed from the parent model to the sub-model if the selected sub-configurable component has not been configured previously.

7. The computer program product of claim 5, wherein one or more values from the parent model are passed to the sub-model if the selected sub-configurable component has been configured previously.

8. The computer program product of claim 5, wherein the computer-usable medium is further embodied with computer-readable program codes for
passing a second set of one or more values for a second set of one or more features from the sub-model for the selected sub-configurable component back to the parent model.

9. The computer program product of claim 1, wherein the sub-model for the selected sub-configurable component is selected from among a plurality of possible sub-models for the component.

10. The computer program product of claim 1, wherein one sub-model is instantiated for each sub-configurable component of the entity selected for configuration.

11. The computer program product of claim 1, wherein the sub-model for the selected sub-configurable component includes
a first set of one or more feature tables, wherein each feature table is associated with a respective feature and includes a set of feature values representative of possible choices for the feature.

12. The computer program product of claim 11, wherein the sub-model for the selected sub-configurable component includes a plurality of feature tables, and wherein feature values for two or more feature tables enumerate relationships between the two or more feature tables.

13. The computer program product of claim 11, wherein the parent model includes
a second set of one or more feature tables for the components of the entity.

14. The computer program product of claim 13, wherein the feature tables for the parent model and the feature tables for the sub-model are localized, and wherein the feature tables for the parent model are inaccessible to the sub-model except via parameter passing.

15. The computer program product of claim 13, wherein the feature tables for the parent model and the feature tables for the sub-model are globalized, and wherein the feature tables for the sub-model are accessible to the parent model.

16. The computer program product of claim 13, wherein a particular feature of the parent model is not bounded to a corresponding feature of a sub-model until the parent model is executed to validate configuration of the entity.

17. The computer program product of claim 1, wherein the parent model and the sub-model for the selected sub-configurable component are displayed on one user interface.

18. The computer program product of claim 17, wherein the parent model and the sub-model for the selected sub-configurable component are displayed on respective frames or on different pages on the user interface.

19. The computer program product of claim 1, wherein
the sub-model is independent of the parent model; and
the sub-model comprises a subset of the plurality of the selectable features.

20. In a computer system, a method for performing sub-configuration of components of an entity, comprising:
configuring a parent model, wherein
an entity is configured using the parent model, and
the parent model comprises a plurality of selectable features;
if the plurality of selectable features comprises more than one instance of a subset of the plurality of selectable features, extracting the subset of the plurality of selectable features;
in response to the extracting, generating a sub-model of the parent model, wherein the sub-model comprises the subset of the plurality of selectable features,
each of the plurality of selected features is mapped from the parent model to the sub-model, and
at least one value required by the parent model is returnable from the sub-model to the parent model;
selecting a particular sub-configurable component among a plurality of sub-configurable components of the entity, wherein
the sub-configurable component is configured using the sub-model;
identifying the sub-model for the selected sub-configurable component, in response to the selection;
configuring the selected sub-configurable component by selecting at least one value for at least one selectable feature among the subset of the plurality of selectable features from the sub-model;
validating the configuration of the selected sub-configurable component based on the sub-model and the one or more values for the component;
validating configuration of the entity based on the parent model and the validated configuration for the selected sub-configurable component; and
outputting a result of the validation of the selected sub-configurable component and the entity.

21. The method of claim 20, further comprising:
providing feedback for each validating.

22. The method of claim 20, further comprising:
configuring and validating each of a plurality of sub-configurable components, one sub-configurable component at a time.

23. The method of claim 22, further comprising:
validating configuration of the entity after configuration and validation of each sub-configurable component.

24. The method of claim 20, further comprising:
localizing data for the sub-model and the parent model.

25. The method of claim 20, further comprising:
globalizing data for the sub-model and the parent model.

26. The method of claim 20, further comprising:
displaying the parent model and the sub-model for the selected sub-configurable component on one user interface screen.

27. The computer system of claim 20, wherein
the sub-model is provided with sufficient information to configure and validate an option represented by the sub-model;
a first set of features among the plurality of selectable features consists of mapped features;
each of the mapped features corresponds to a respective feature in the parent model;
a second set of features among the plurality of selectable features consists of local features; and
each of the local features does not affect configuration in the parent model.

28. A computer program product for performing sub-configuration of components of an entity, the computer program product comprising a computer-usable storage medium having embodied therein computer-readable program codes that are executable by a processor and are configured to:
configure a parent model, wherein
an entity is configured using the parent model, and
the parent model comprises a plurality of selectable features;
if the plurality of selectable features comprises more than one instance of a subset of the plurality of selectable features, extract the subset of the plurality of selectable features;
in response to the extracting, generate a sub-model of the parent model, wherein
the sub-model comprises the subset of the plurality of selectable features,
each of the plurality of selected features is mapped from the parent model to the sub-model, and at least one value required by the parent model is returnable from the sub-model to the parent model;
select a particular sub-configurable component among a plurality of sub-configurable components of the entity, wherein
the sub-configurable component is configured using the sub-model;
identify the sub-model for the selected sub-configurable component, in response to the selection;
configure the selected sub-configurable component by selecting at least one value for at least one selectable feature among the subset of the plurality of selectable features from the sub-model;
validate the configuration of the selected sub-configurable component based on the sub-model and the one or more values for the component;
validate configuration of the entity based on the parent model and the validated configuration for the selected sub-configurable component; and
output a result of the validation of the selected sub-configurable component and the entity.

29. The computer program product of claim 28, wherein
a first set of features among the plurality of selectable features consists of mapped features;
each of the mapped features corresponds to a respective feature in the parent model;
a second set of features among the plurality of selectable features consists of local features; and
each of the local features does not affect configuration in the parent model.

* * * * *

UNITED STATES PATENT AND TRADEMARK OFFICE
CERTIFICATE OF CORRECTION

| | | |
|---|---|---|
| PATENT NO. | : 7,873,503 B2 | |
| APPLICATION NO. | : 10/299215 | |
| DATED | : January 18, 2011 | |
| INVENTOR(S) | : Jeffrey William Loomans et al. | |

It is certified that error appears in the above-identified patent and that said Letters Patent is hereby corrected as shown below:

On sheet 1 of 11, in Figure 1, below A, line 1, delete "Chasis" and insert -- Chassis --, therefor.

On sheet 1 of 11, in Figure 2B, below A, line 1, delete "Chasis" and insert -- Chassis --, therefor.

On sheet 2 of 11, in Figure 2A, below A, line 1, delete "Chasis" and insert -- Chassis --, therefor.

On sheet 4 of 11, in Figure 4, Ref. Numeral 410, line 1, delete "Chasis" and insert -- Chassis --, therefor.

In column 3, line 39, delete "top-lever" and insert -- top-level --, therefor.

In column 3, line 59, delete "210j" and insert -- 210l --, therefor.

In column 6, line 32, delete "a" and insert -- at --, therefor.

In column 6, line 47, delete "330X," and insert -- 330x, --, therefor.

In column 6, line 49, delete "330X" and insert -- 330x --, therefor.

In column 6, line 52, delete "330X" and insert -- 330x --, therefor.

In column 6, line 67, delete "330X," and insert -- 330x, --, therefor.

In column 7, line 2, delete "330X" and insert -- 330x --, therefor.

In column 17, line 41, delete "benefits" and insert -- benefits. --, therefor.

In column 19, line 29, in claim 5, delete "set one" and insert -- set of one --, therefor.

Signed and Sealed this
Twentieth Day of September, 2011

David J. Kappos
*Director of the United States Patent and Trademark Office*